United States Patent [19]
Sakurai et al.

[11] Patent Number: 5,456,423
[45] Date of Patent: Oct. 10, 1995

[54] TAPE REEL WITH THIN FLANGE PORTIONS

[75] Inventors: Satoshi Sakurai; Makoto Aoki; Masahiro Makino, all of Tokyo, Japan

[73] Assignee: Sony Corporation, Tokyo, Japan

[21] Appl. No.: 291,358

[22] Filed: Aug. 16, 1994

Related U.S. Application Data

[63] Continuation of Ser. No. 991,333, Dec. 16, 1992, abandoned.

Foreign Application Priority Data

Dec. 19, 1991 [JP] Japan .................. 3-111177 U
Feb. 18, 1992 [JP] Japan .................. 4-030757

[51] Int. Cl.[6] .................................. B65H 75/14
[52] U.S. Cl. .................. 242/614; 242/614.1; 242/610.6
[58] Field of Search .................. 242/71.8, 118.4, 242/345, 348, 606, 608, 610.6, 614, 614.1, 118.31, 118.4, 118.7, 322, 326.3, 327, 376, 407, 600, 608.8

[56] References Cited

U.S. PATENT DOCUMENTS

| | | | |
|---|---|---|---|
| 3,236,473 | 2/1966 | Hultgren | 242/610.4 |
| 3,796,387 | 3/1974 | Zielke | 242/606 |
| 4,807,826 | 2/1989 | Iwahashi | 242/608 |
| 5,074,487 | 12/1991 | Okamura et al. | 242/608.8 |

FOREIGN PATENT DOCUMENTS

| | | |
|---|---|---|
| 0136504 | 4/1985 | European Pat. Off. . |
| 0247821 | 12/1987 | European Pat. Off. . |
| 247822 | 12/1987 | European Pat. Off. . |
| 0376569 | 7/1990 | European Pat. Off. . |

Primary Examiner—John Q. Nguyen
Attorney, Agent, or Firm—Jay H. Maioli

[57] ABSTRACT

A tape reel in which a thin flange portion is formed by reducing a thickness of each of front and rear flange surfaces of the tape reel and a thick portion having a thickness larger than that of the thin flange portion is formed at a plurality of places of an outer periphery of the flange portion. When the tape reel is molded by using a molding metal mold, a pin is inserted into the molding metal mold at a portion corresponding to a portion where a resin is filled into the thin flange portion last, and air and gas within a cavity are discharged from a spacing formed between the molding metal mold and the pin. Thus, the occurrence of short mold and weld line on the thin portion of the tape reel thus molded can be avoided and a rotational fluctuation of the reel flange surface can be avoided. The front and rear surface portions of each of upper and lower flanges of the tape reel are further formed as thin flange portions by uniformly reducing the thickness of each of the front and rear surface portions thereof except outer peripheral edge portions thereof and radial tape position restricting ribs are formed on tape contact flange surfaces of the upper and lower flanges. Thus, the flanges can be prevented from being warped even when the thicknesses thereof are reduced.

7 Claims, 8 Drawing Sheets

TAPE REEL WITH THIN FLANGE PORTIONS

This is a continuation of application Ser. No. 07/991,333 filed Dec. 16, 1992, now abandoned.

BACKGROUND OF THE INVENTION

1. Field of the Invention

The present invention relates to tape cassettes and, more particularly, to tape reels around which a magnetic tape or the like is wound and a metal mold for manufacturing these tape reels.

2. Description of the Prior Art

FIG. 1 of the accompanying drawings shows an example of a conventional tape reel. As shown in FIG. 1, the conventional tape reel comprises a reel hub 3 serving as a tape wrapping shaft and parallel upper and lower flanges 1 and 2 attached to the reel hub 3. These upper and lower flanges 1 and 2 restrict the positions of edge portions of a magnetic tape (not shown) wound around the reel hub 3 and the magnetic tape is wound around the reel hub 3.

When the above tape reel is made light-weight or is reduced in cost in accordance with the reduction of material, if the outer diameters of the upper and lower flanges 1 and 2 are the same, then it is proposed that the thicknesses of both surface sides of the upper flange 1 and the lower flange 2, i.e., the thickness of the upper surface side of the upper flange 1 and the thickness of the lower surface side of the lower flange 2 are reduced as shown in FIG. 1.

If, however, only the thicknesses of the front surface sides of the upper and lower flanges 1 and 2 are reduced, then the upper and lower flanges 1 and 2 are curved to the rear surface sides whose thicknesses are not reduced, i.e., the upper and lower flanges 1 and 2 are warped as shown by phantoms in FIG. 1. As a cause that the upper and lower flanges 1 and 2 are warped, it is considered that the upper and lower flanges 1 and 2 are warped because the upper and lower flanges are unevenly shrunk as the molded products are cooled after the tape reel was molded by the injection molding process.

Therefore, when the upper and lower flanges 1 and 2 are Warped toward the rear surface sides, a disc rotation fluctuation occurs while the tape reel is rotated. Further, the spacing between the upper and lower flanges 1 and 2 is reduced so that the edge portions of the magnetic tape wrapped around the reel hub 3 are pressed by the rear surfaces of the upper and lower flanges 1 and 2, which unavoidably damages a so-called tape edge.

To eliminate the aforesaid drawbacks, there has been proposed a tape reel 11 shown in FIGS. 2 and 3 of the accompanying drawings.

As shown in FIGS. 2 and 3, the front and rear flange surfaces are molded as three arcuate thin flanges portions 15 which result from reducing a uniform thickness from an outer peripheral edge portion 12 to a reel bearing shaft 13 while a plurality of (three) radial ribs 14 are left.

When the above tape reel 11 is molded by using a metal mold, as shown in FIG. 2, an amount of resin material flowed into the three arcuate thin flange portions 15 is small and the last injection of resin is effected on portions 15c of the outer peripheral sides of the flange portions 15. Consequently, air within a cavity of the metal mold and gas discharged from the molding material are not discharged to the outside of the cavity and remain within the cavity. As a result, a so-called short mold or weld line of the thin flange portion is produced in the molded product, which deteriorates the quality of the molded product. Also, the flange is warped due to the short mold and the rotation of the flange surface is fluctuated considerably. There is then the problem such that the edge portions of the magnetic tape wrapped around the tape reel are damaged.

OBJECTS AND SUMMARY OF THE INVENTION

In view of the above-mentioned aspect, it is an object of the present invention to provide a tape reel in which the aforesaid shortcomings and disadvantages of the prior art can be eliminated.

It is another object of the present invention to provide a tape reel in which reel flanges can be prevented from being warped even when the thickness of each of the flanges is reduced.

It is still another object of the present invention to provide a tape reel which can be made light in weight.

It is a further object of the present invention to provide a tape reel in which a material therefor can be reduced.

It is yet a further object of the present invention to provide a tape cassette in which the occurrence of short mold and weld line on the tape reel provided as a molded product can be avoided.

It is still a further object of the present invention to provide a tape cassette in which rotational fluctuation of reel flange surfaces can be avoided.

It is still a further object of the present invention to provide a tape reel manufacturing metal mold in which the occurrence of short mold and weld line on the tape reel provided as a molded product can be avoided.

It is still a further object of the present invention to provide a tape reel manufacturing metal mold in which rotational fluctuation of reel flange surfaces can be avoided.

According to a first aspect of the present invention, there is provided a tape reel which comprises an upper flange, a lower flange, thin flange portions which result from uniformly reducing front and rear flange surfaces of the upper and lower flanges in a molding process, and a plurality of tape position restricting ribs formed on the upper and lower flanges at tape contact flange surfaces of the thin flange portions such that the plurality of tape position restricting ribs are radially extended from a central portion of the tape reel to an outer peripheral side.

According to a second aspect of the present invention, there is provided a tape reel which comprises an upper flange and a lower flange, each of which is formed as a thin flange portion which results from uniformly reducing front and rear flange surfaces of each of the upper and lower flanges in a molding process, and thick portions which are thicker than the thin flange portions being formed at a plurality of places in the vicinity of an outer periphery of the thin flange portions.

According to a third aspect of the present invention, there is provided a tape reel manufacturing metal mold which comprises a tape reel molding metal mold for molding a tape reel in which upper and lower flanges of the tape reel are molded as thin flange portions by uniformly reducing a thickness of each of front and rear flange surfaces, and a plurality of gas and air discharging pins provided on a portion where a resin is filled into the thin flange portions last in the manufacturing process of the tape reel.

As a fourth aspect of the present invention, there is provided a tape cassette having a tape reel which comprises an upper flange and a lower flange, each of which is formed as a thin flange portion which results from uniformly reducing front and rear flange surfaces of the upper and lower flanges in a molding process, and a plurality of tape position restricting ribs formed on the upper and lower flanges at tape contact flange surfaces of the thin flange portions such that the plurality of tape position restricting ribs are radially extended from a central portion of the tape reel to an outer peripheral side thereof.

As a fifth aspect of the present invention, there is provided a tape cassette having a tape reel which comprises thin flange portions which result from uniformly reducing front and rear flange surfaces of the upper and lower flanges in a molding process, and thick portions which are thicker than the thin flange portions being formed at a plurality of places in the vicinity of an outer periphery of the thin flange portions.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

A first embodiment of the present invention will hereinafter be described with reference to the drawings.

Figure 1:
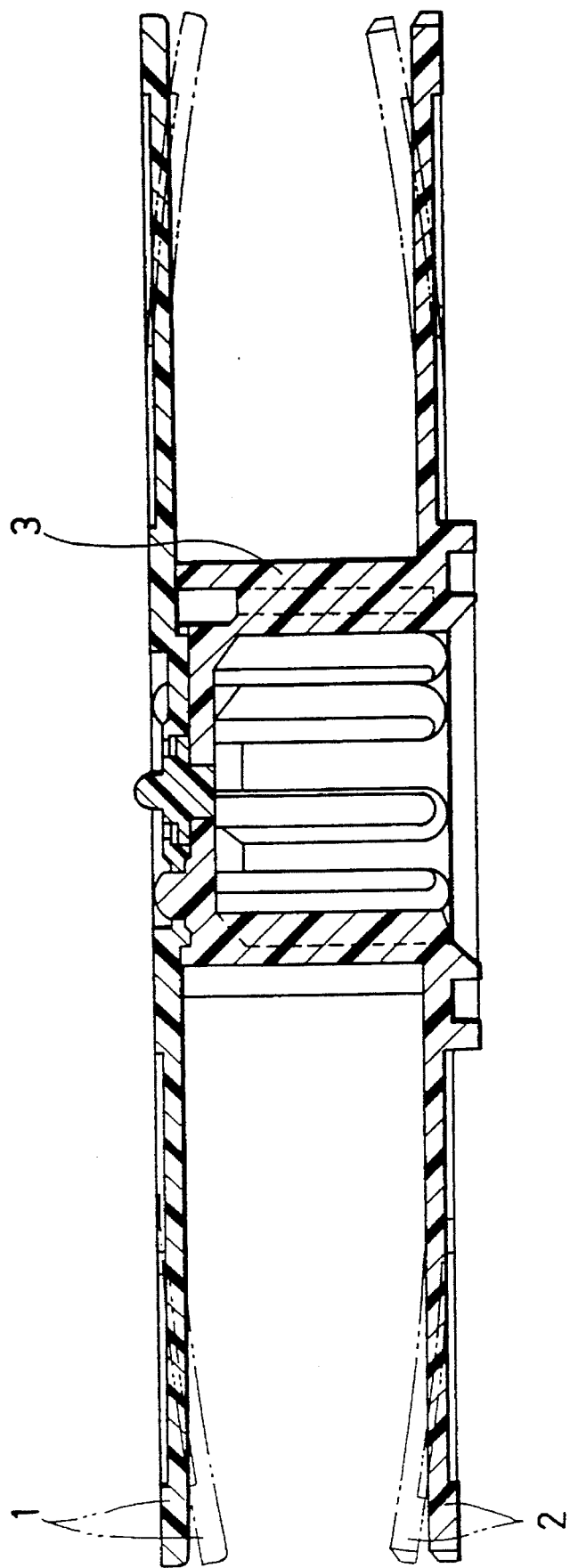
FIG. 1 is a longitudinal cross-sectional view showing an example of a conventional tape reel.
Figure 2:
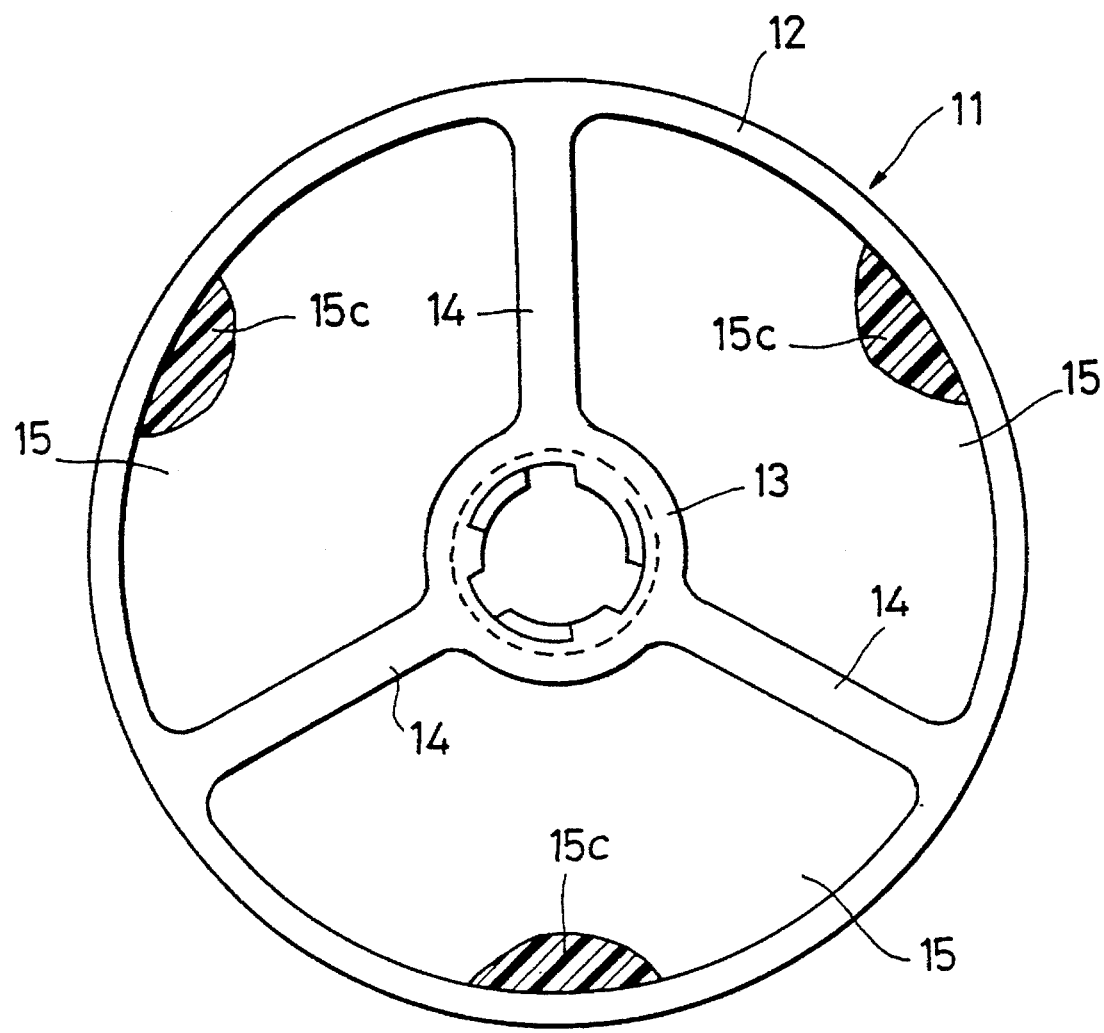
FIG. 2 is a plan view showing an upper flange of another example of the conventional tape reel.
Figure 3:
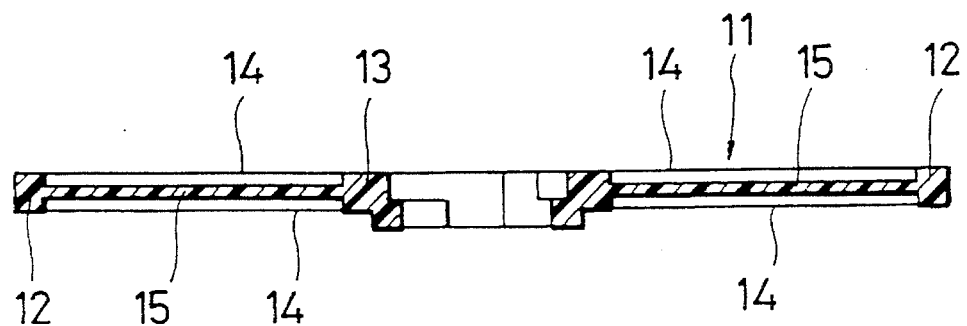
FIG. 3 is a cross-sectional view showing the upper flange of another example of the conventional tape reel.
Figure 4:
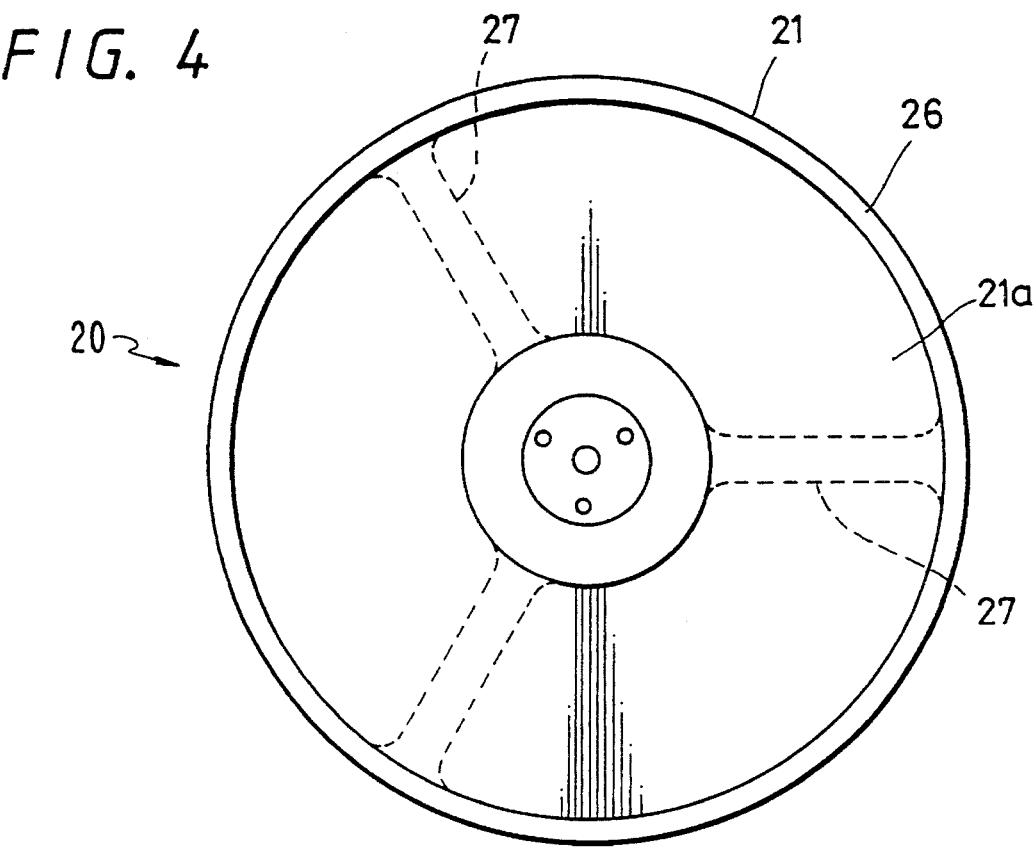
FIG. 4 is a plan view showing a front surface of an upper flange of a tape reel according to a first embodiment of the present invention.
Figure 5:
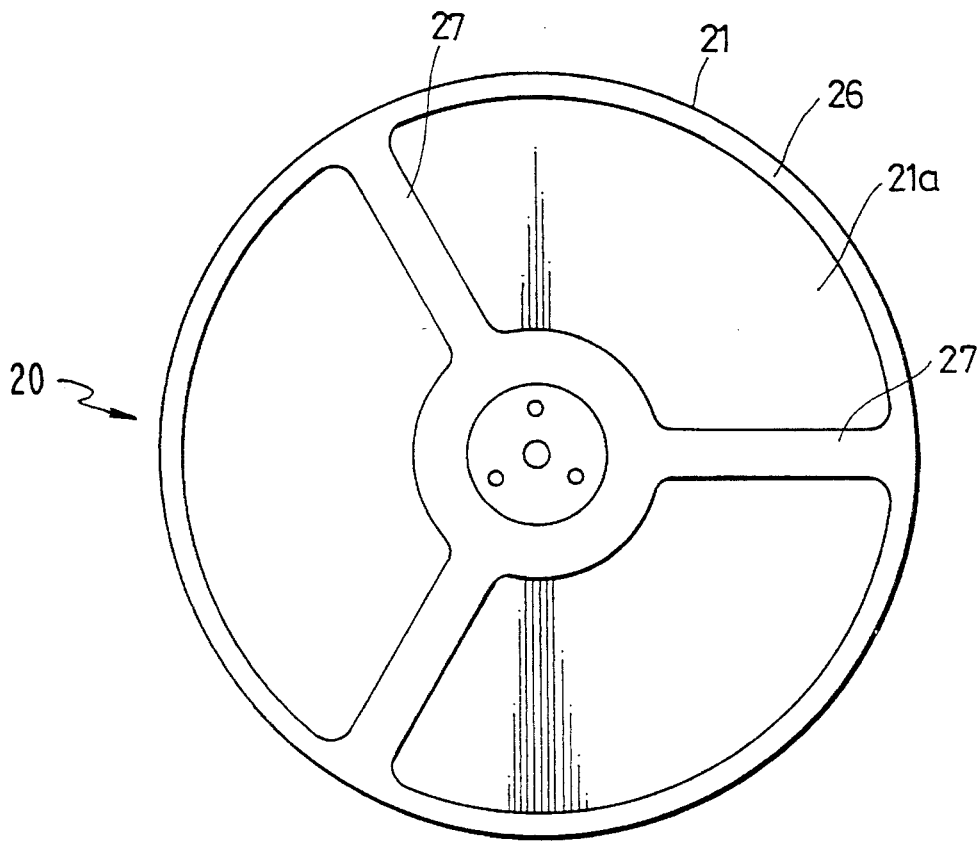
FIG. 5 is a plan view showing a rear surface of the upper flange of the tape reel according to the first embodiment of the present invention.

FIG. 4 of the accompanying drawings shows a plan view of a surface of an upper flange of a tape reel according to the first embodiment of the present invention. FIG. 5 of the accompanying drawings is a plan view showing a rear surface of the same upper flange and FIG. 6 of the accompanying drawings shows a longitudinal cross-sectional view of an overall arrangement of the tape reel according to the first embodiment of the present invention.

Figure 6:
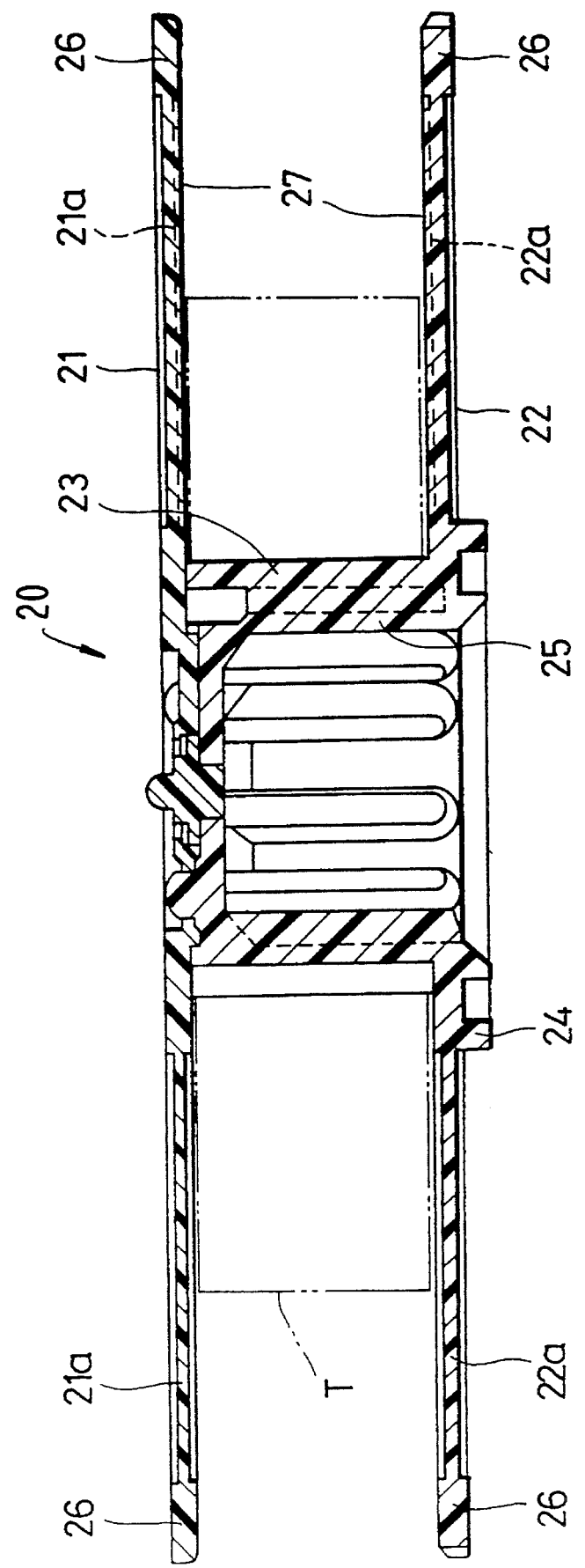
FIG. 6 is a longitudinal cross-sectional view of the tape reel according to the first embodiment of the present invention.

As illustrated in FIGS. 4 to 6, a tape reel 20 of the first embodiment comprises an upper flange 21, a lower flange 22 and a reel hub 23. The lower flange 22 and the reel hub 23 are molded as one body and the upper flange 21 is coupled to the concave portion of an upper end portion of the reel hub 23 by some suitable process such as a caulking or the like. A lower reel receiving shaft 24 is formed at a central lower portion of the lower flange 22. Through the lower reel receiving shaft 24 and on the inside of the reel hub 23, there is formed a hub driving concave portion 25 into which a hub drive shaft (not shown) is inserted.

The upper flange 21 and the lower flange 22 will be described more fully. The upper and lower flanges 21 and 22 are uniformly reduced in thickness from their front and rear flange surfaces by the same thickness except at outer peripheral edge portions 26 thereof to thereby form thin flange portions 21a and 22a. That is, the respective flange portions 21a and 22a are molded so as to be located at the central positions in the thicknesses of the upper and lower flanges 21 and 22 as shown in FIG. 6.

On the flange surfaces on the rear surfaces of the upper and lower flanges 21 and 22, i.e., flange surfaces, with which a magnetic tape T is brought in contact, of the upper and lower flanges 21 and 22, there are formed a plurality of (three ribs in this embodiment) tape position restricting ribs 27 which are radially extended from the reel hub 23 side to the outer peripheral side (see FIGS. 4 and 5). The tape position restricting ribs 27 are formed on the same plane as the outer peripheral edge portions 26 of the upper and lower flanges 21, 22 so that the thin flange portions 21a, 22a formed on the rear surface sides of the upper and lower flanges 21, 22 are formed as arcuate portions, respectively as shown in FIG. 5.

According to the tape reel 20 thus arranged, when the magnetic tape T is wrapped around the reel hub 23 as shown by a phantom in FIG. 6, the tape edges of the magnetic tape T are positionally restricted by the tape position restricting ribs 27 and aligned regularly. Accordingly, although the spacing between the flange surfaces of the upper and lower flanges 21, 22 is relatively increased as compared with the tape width of the magnetic tape T because the upper and lower flanges 21, 22 are formed as the thin flange portions 21a, 22a, the magnetic tape T can be accurately wound around the reel hub 23 by a plurality of radial tape position restricting ribs 27 formed on the rear surfaces of the upper and lower flanges 21, 22, similar to the conventional tape reel.

The thin flange portions 21a, 22a of the upper and lower flanges 21, 22 are molded so as to be located at the central portions of the thicknesses of the upper and lower flanges 21, 22 so that, even when molded products are shrunk because the molded product is cured after the product tape reel was molded by the injection molding process, the upper and lower flanges 21 and 22 are shrunk equally. Therefore, it is possible to obtain the tape reel in which the upper and lower flanges 21, 22 can be prevented from being warped. As a result, when the tape reel is rotated, the rotational fluctuation of the upper and lower flanges 21, 22 can be avoided and the tape edge of the magnetic tape T can be prevented from being urged against the flange surfaces, which can prevent the tape edges from being damaged. Furthermore, since the upper and lower flanges 21, 22 are reduced in thickness, the tape reel of this embodiment can be made light in weight and the material for making this tape reel can be saved.

Of conventional tape reels, there is known a tape reel in which a flange portion comprises only an outer peripheral edge portion and a plurality of radial ribs. In the case of this type of conventional tape reel, the thickness thereof must be increased in order to obtain a predetermined strength of the tape reel. There is then the problem that such tape reel cannot be decreased in weight. In the case of the tape reel according to this embodiment, the thicknesses of the outer peripheral edge portion 26 of the tape reel and the tape position restricting ribs 27 may not be changed and may be ordinary ones. Therefore, it is needless to say that the tape reel can be reduced in weight on the whole.

While the three tape position restricting ribs 27 are formed in a radial fashion as described above, the present invention is not limited thereto and the number of the tape position restricting ribs 27 may be varied freely.

Furthermore, the tape reel according to the first embodiment can be applied to a wide variety of cassette tape reels.

A second embodiment of the present invention will hereinafter be described with reference to the drawings.

Figure 7:
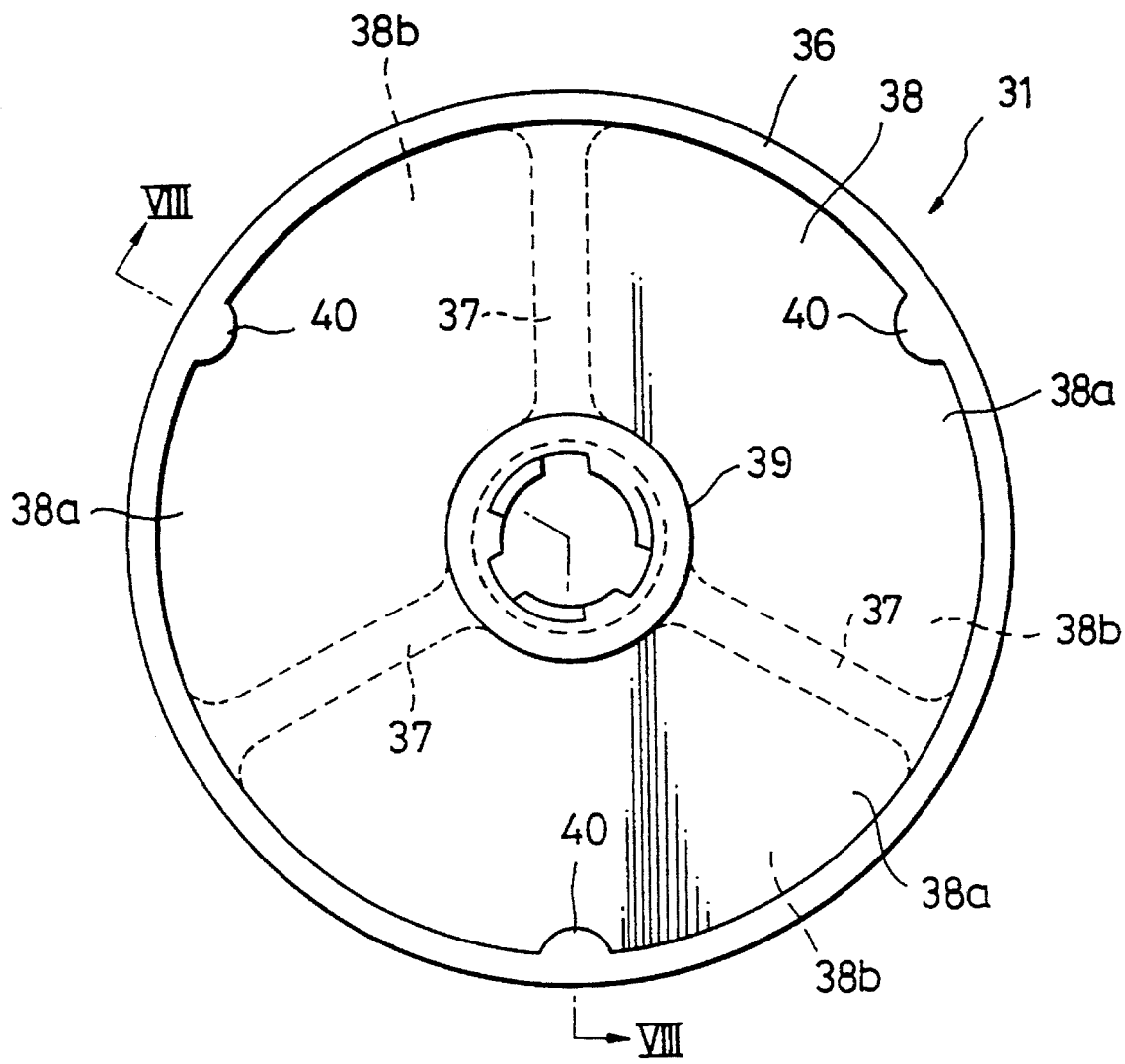
FIG. 7 is a plan view showing an upper flange of the tape reel according to a second embodiment of the present invention.
Figure 8:
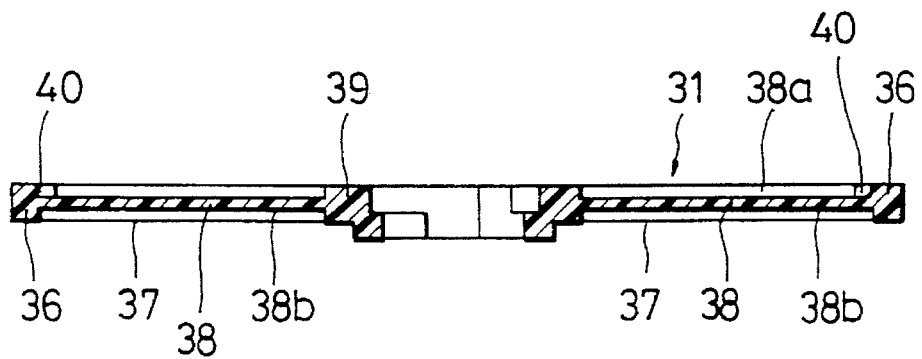
FIG. 8 is a cross-sectional view taken along the line VIII—VIII in FIG. 7.

FIG. 7 of the accompanying drawings shows a plan view of an upper flange of a tape reel according to a second embodiment of the present invention, and FIG. 8 of the accompanying drawings shows a cross-sectional view taken along the line VIII—VIII in FIG. 7.

As illustrated, a surface side (tape opposing side) of an upper flange 31 is molded as an annular thin flange portion 38*a* which is reduced in thickness by a predetermined thickness except an outer peripheral edge portion 36 of a predetermined width. A rear surface side (tape side) of the upper flange 31 is molded as three arcuate thin flange surfaces 38*b* which are reduced in thickness in such a fashion that a plurality of tape position restricting ribs 37, each having a predetermined width, are radially extended from the outer peripheral edge portion 36 and a reel bearing receiving shaft 39. The tape position restricting ribs 37 are flush with the outer peripheral edge portion 36. These thin flange surfaces 38*a*, 38*b* constitute a flange portion 38 where the upper flange 31 is reduced in thickness by the same thickness from the front and rear surfaces thereof.

Reference numerals 40 designate three thick portions integrally molded with the outer peripheral edge portion 36 at an equal interval on the thin flange surfaces 38*a* of the surface side of the above flange portion 31. These thick portions 40 become a main portion of the present invention. The thick portions 40 are each a portion in which the last resin injection is effected when the tape reel is molded by using the metal mold. According to the second embodiment of the present invention, the thick portions 40 are formed as semi-circular thick portions and are flush with the outer peripheral edge portion 36.

Since the thick portions 40 are provided on the outer peripheral portions of the thin flange surfaces 38*a*, the outer peripheral portions of the thin flange surfaces 38*a*, 39*b* which are weak in strength can be held at sufficient strength. Consequently, the rotational fluctuation of the upper flange 31 can be avoided during rotation of the tape reel. Therefore, the tape edge of the tape wrapped around the tape reel can be prevented from being damaged.

Figure 9:
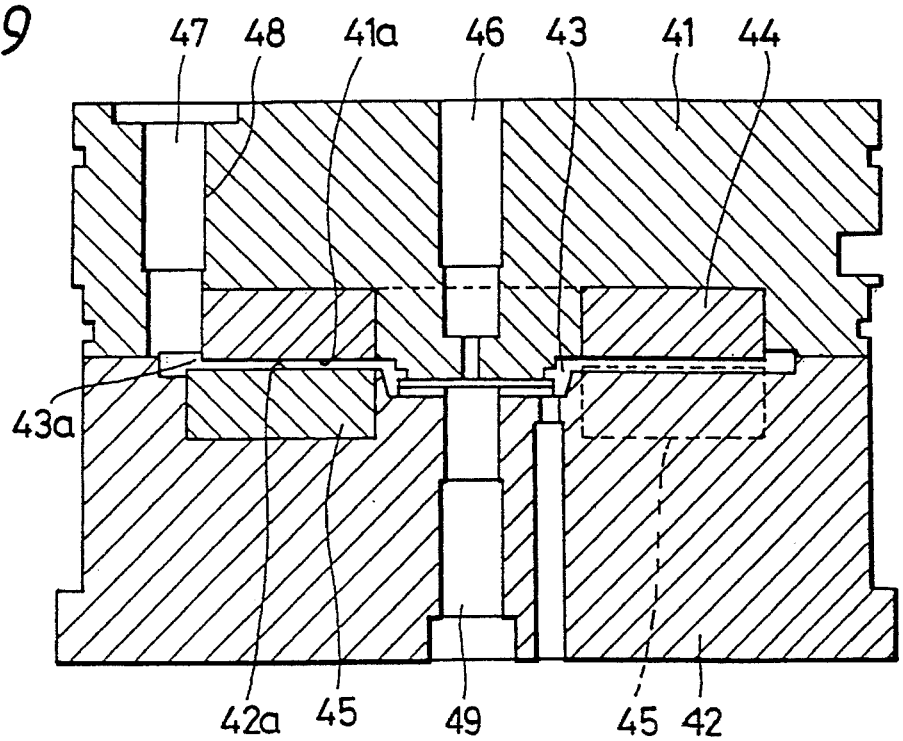
FIG. 9 is a cross-sectional view of a metal mold for molding the upper flange according to the second embodiment of the present invention.
Figure 10:
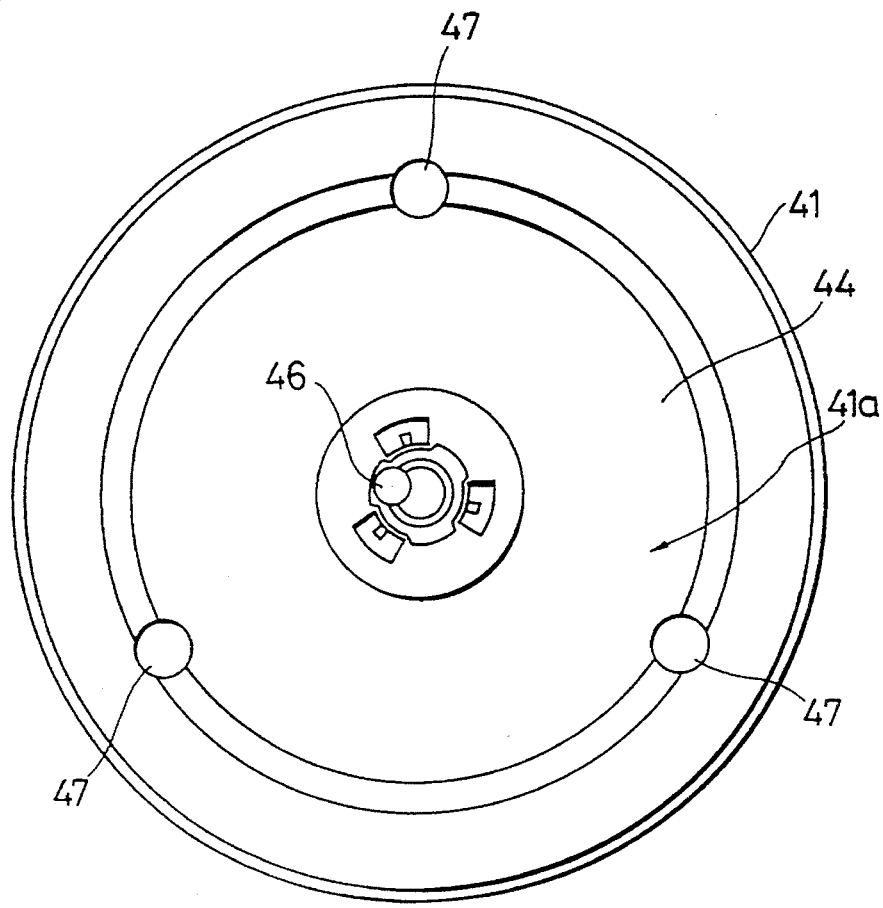
FIG. 10 is a plan view showing a rear surface of a molded surface of the upper flange molded by a female metal mold according to the second embodiment of the present invention.
Figure 11:
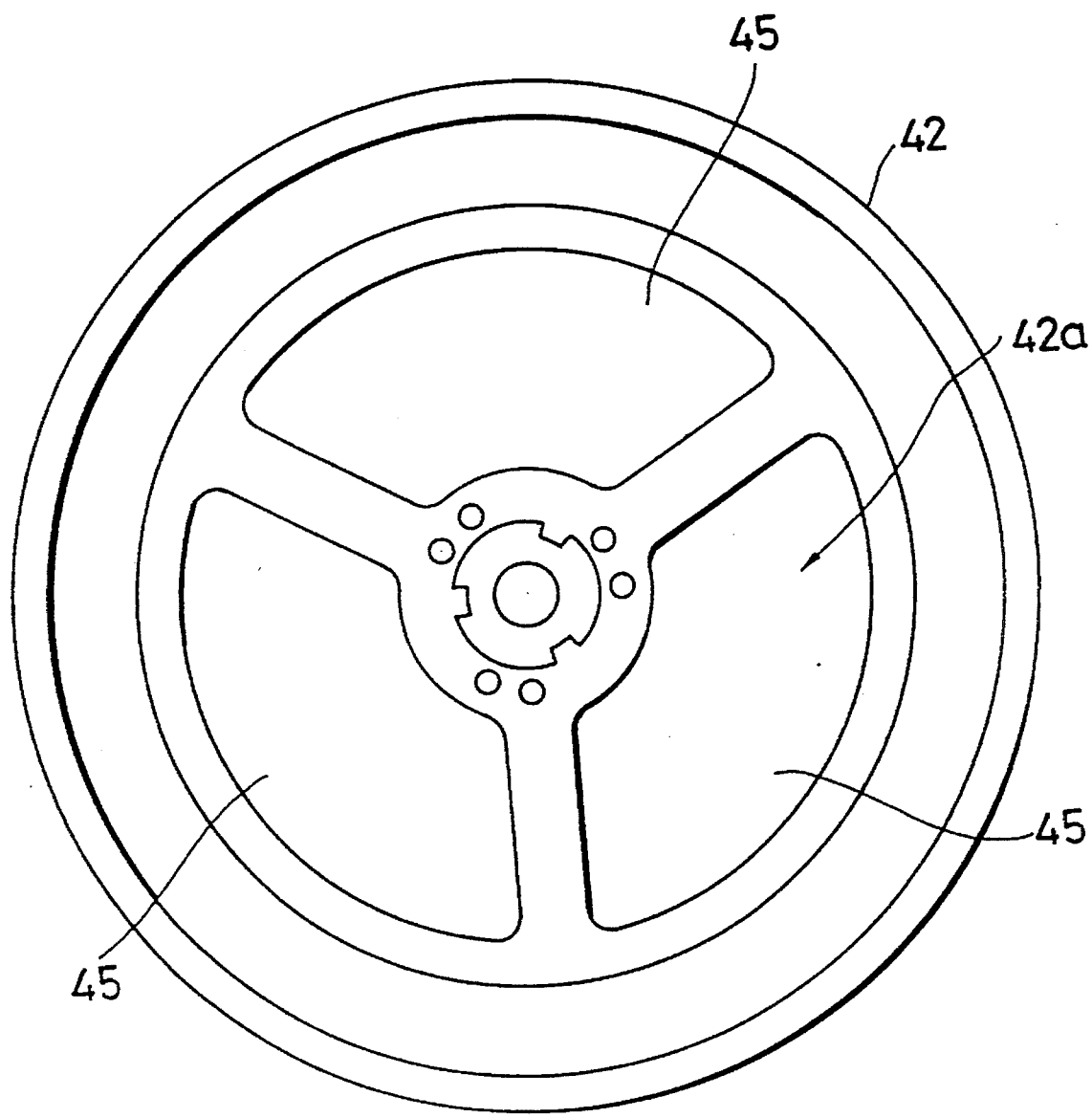
FIG. 11 is a plan view showing a molded surface of the upper flange molded by a male metal mold according to the second embodiment of the present invention.

FIG. 9 of the accompanying drawings shows a cross-sectional view of a metal mold which is used to mold the upper flange 31. FIG. 10 of the accompanying drawings shows a plan view of a female metal mold which serves as a cavity side and is seen from the cavity surface side. FIG. 11 of the accompanying drawings shows a plan view of a molding flask under the condition such that a male metal mold which serves as a core side is seen from the cavity surface side.

As illustrated, the molding metal mold comprises a female metal mold 41 and a male metal mold 42. A molding mold 41*a* of the female metal mold 41 and a molding mold 42*a* of the male metal mold 42 constitute a cavity 43 that serves as a molding room for the above upper flange. More specifically, an annular-shaped insert or liner 44 that is used to mold the thin flange surfaces 38*a* (see FIGS. 7, 8) is incorporated into the female metal mold 41, while a plurality of arcuate inserts or liners 45 that are used to mold the thin flange surfaces 38*b* (see FIGS. 7, 8) are incorporated into the male metal mold 42.

In the female metal mold 41, there is provided a sprue 46 which serves as a mouth through which a resin is injected into the cavity 43. Three pins 47 that are used to discharge gas or air within the cavity 43 to the outside are inserted into the female metal mold 41 at its portions corresponding to the above thick portions 40 of the upper flange 38. A molding portion 43a of the thick portion 40 is formed on the top end portion of each pin 47. That is, the gas or air within the cavity 43 is discharged through a spacing 48 formed between the female metal mold 41 and the pin 47. The spacing 48 formed between the female metal mold 41 and the pin 47 in the diametrical direction is, for example, about ²⁄₁₀₀ mm. In FIG. 9, reference numeral 49 depicts a so-called core pin of the male metal mold 42.

A molding process for molding the upper flange 31 by using the molding metal mold thus arranged will be described with reference to also FIGS. 7 and 8.

Figure 12:
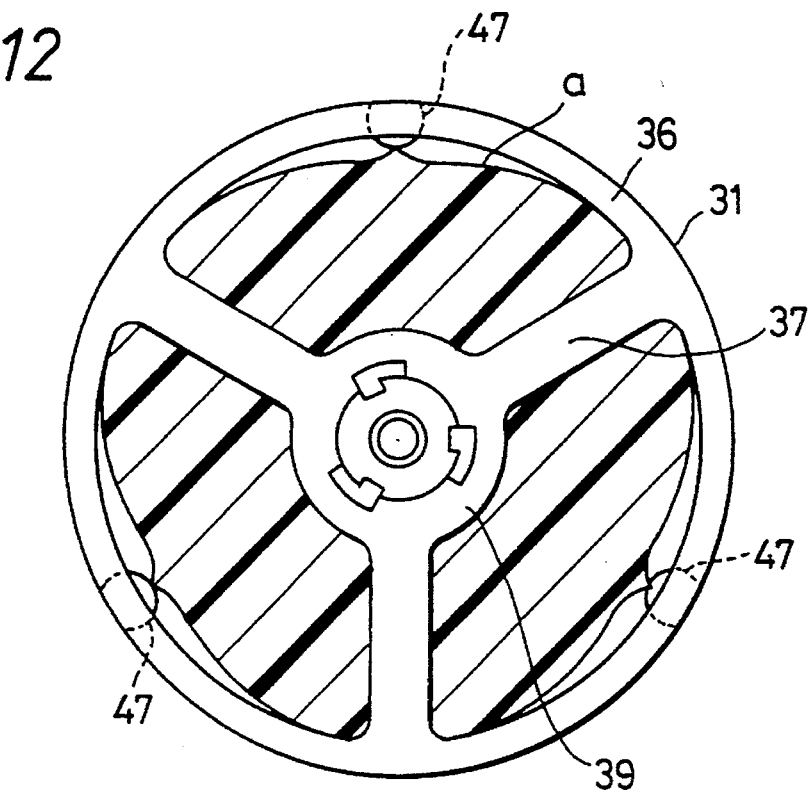
FIG. 12 is a plan view of the rear surface of the upper flange and illustrating the condition such that the last resin injection process is effected in the second embodiment of the present invention.

Initially, a resin is filled in the molding metal mold from the sprue 46. The resin filled into the molding metal mold from the sprue 46 moves from the reel receiving shaft 39 through the ribs 37 each having a relatively wide path and then filled in the outer peripheral edge portion 36. On the other hand, since the path of the thin flange portion 38 is narrow, the resin flows slowly. Therefore, as shown in FIG. 12 of the accompanying drawings, a resin a is filled toward the outside from the surrounding of the reel receiving shaft 39. Finally, the resin is filled into the thick portion 40 of the pin 47 as shown in FIG. 12. An amount of resin filled into the thick portion 40 is relatively large so that, after being discharged at the portion of the thick portion 40 where the final filling is effected, air or gas within the cavity 43 is discharged through the spacing 48 between the female metal mold 41 and the pin 47 to the outside. Therefore, in the final stage of the molding process, the air or gas within the cavity 43 is thoroughly discharged so that defects such as the short mold or the like on the flange thin portion can be avoided and that the weld line can be prevented from being produced on the molded product. Thus, the quality of molded product can be enhanced.

In the tape reel thus arranged and molded by the molding metal mold as described above, since the thick portions 40 are molded on the outer peripheral portion of the thin flange portion 38 which is the final filling portion, the outer peripheral portion of the thin flange portion 38 can be reinforced and the rotational fluctuation of the flange surface can be avoided while the tape reel is rotated. As a result, the tape edge can be prevented from being damaged. Furthermore, the occurrence of defects such as a short mold or the like and the occurrence of weld line can be removed from the flange thin portion provided as the molded product, which can improve the quality of the product.

Figure 13:
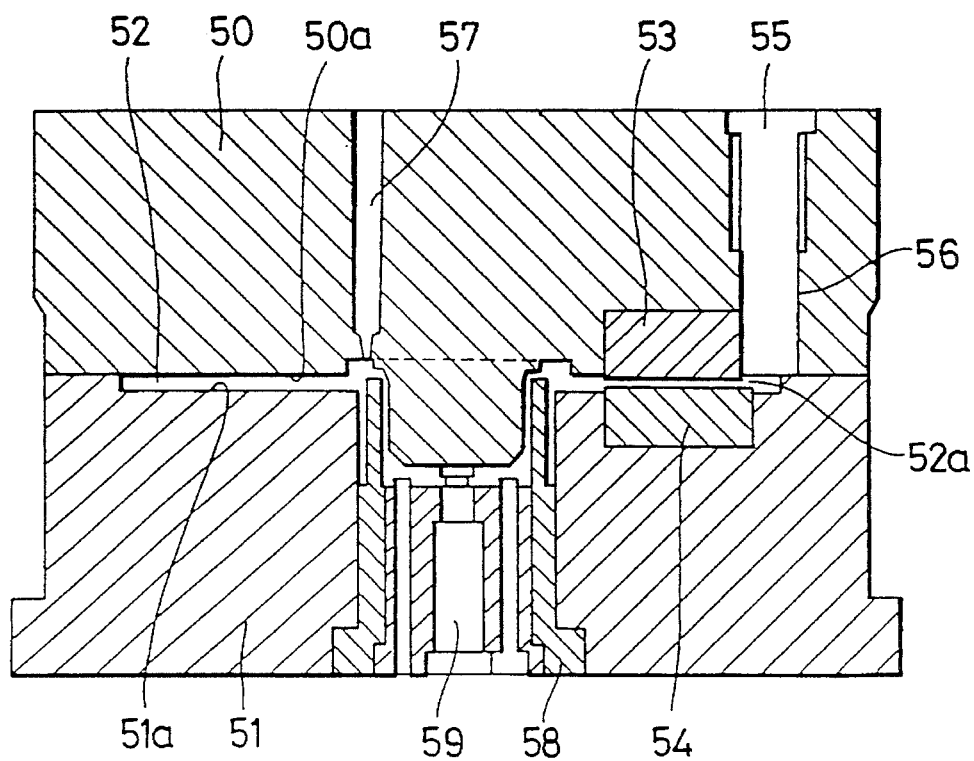
FIG. 13 is a cross-sectional view of a metal mold which molds a lower flange according to the second embodiment of the present invention.

FIG. 13 of the accompanying drawings shows a cross-sectional view of a molding metal mold that is used to mold the lower flange.

As shown in FIG. 13, this molding metal mold comprises a female metal mold 50 serving as a cavity side and a male metal mold 51 serving as a core side. A molding mold 50a of the female metal mold 50 and a molding mold 51a of the male metal mold 51 constitute a cavity 52 that serves as a room in which a lower flange unitarily formed with the reel hub is molded. In the case of the lower flange, similarly to the upper flange, radial-shaped ribs are formed on the front surface side (tape side) of the flange surface. Accordingly, the front flange surface is reduced in thickness so as to provide arcuate thin portions. Inserts or liners 53 and 54 that are used to mold the thin portions are incorporated within the female metal mold 50 and the male metal mold 51, respectively. Into the female metal mold 50, there is inserted an air or gas discharging pin 55 having a predetermined spacing 56 between it and the female metal mold 50 in association with the thick portion molded on the portion where the resin is filled last similarly to the above upper flange. A thick portion molding portion 52a is formed on the top end side of the pin 55. In FIG. 13, reference numeral 57 depicts a sprue used to fill a resin into the cavity 52, 58 an insert or liner used to mold a hub of the lower flange and 59 a so-called core pin.

Also in the thus arranged molding metal mold of the lower flange, similarly to the upper flange metal mold, air or gas within the cavity 52 can be discharged to the outside through the spacing 56 formed between the female metal mold 50 and the pin 55.

While the above thick portions 40 are flushed with the flange outer peripheral edge portion 36 in thickness as described above, the present invention is not limited thereto and the thickness of the thick portion 40 may be larger than at least that of the thin flange portion 38. Further, while the thick portion 40 is formed as the arcuate shape as described above, the present invention is not limited thereto and the shape of the thick portion 40 may be varied freely.

Furthermore, while the thick portion 40 is formed on the surface side of the upper flange 31, the present invention is not limited thereto and the thick portion 40 may be formed on the flange outer peripheral portions of the front and rear thin flange surfaces 38a, 38b of the upper flange 31.

As described above, according to the present invention, since the front and rear surface portions of the upper and lower flanges are molded as the thin flange portions which result from uniformly reducing the thickness of their front and rear surface portions by the same thickness, the molded product can be prevented from being warped and the rotational fluctuation of the flange surface can be avoided while the tape reel is rotated. Consequently, the tape edge of the magnetic tape can be prevented from being damaged. Also, since the upper and lower flanges are reduced in thickness, the tape reel can be reduced in weight and the molding material for molding the tape reel can be saved.

Since the radial tape position restricting ribs are formed on the flange surfaces at which the upper and lower flanges are brought in contact with the magnetic tape, the magnetic tape can be prevented from being wound around the tape reel irregularly. Hence, the quality of the tape reel can be prevented from being deteriorated.

Further, since a plurality of thick portions which are thicker than the flange portion are formed on the outer peripheral portion of the thin flange portions which result from reducing the thickness of the front and rear flange surfaces of the reel flange, the outer peripheral portion of the thin flange portion can be increased in strength. Consequently, the reel flange can be prevented from being warped and the rotational fluctuation of the flange surface can be avoided. Therefore, the tape edge of the magnetic tape wrapped around the tape reel can be prevented from being damaged.

Furthermore, since the thick portion formed on the outer peripheral portion of the thin flange portion is the portion where the resin is filled last in the molding process and the pin for discharging the gas or air is formed on the metal mold portion of this portion, the gas or air within the metal mold in the final stage of the molding process can be discharged completely. Therefore, the occurrence of defects such as the short mold or the occurrence of weld line on the flange thin portion as the molded product can be avoided. Thus, the quality of the tape reel as the molded product can be improved considerably.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A tape reel comprising:

an upper flange;

a hub between said flanges;

a lower flange;

thin flange portions which result from uniformly reducing relative to an outer peripheral edge portion a thickness in front and rear flange surfaces of said upper and lower flanges, respectively, in a molding process; and a plurality of tape position restricting ribs formed on said upper and lower flanges only at tape contact flange surfaces of said thin flange portions such that said plurality of tape position restricting ribs are radially extended from a central portion of said tape reel to said outer peripheral edge portions.

2. The tape reel according to claim 1, wherein each said outer peripheral edge portion has a predetermined width.

3. The tape reel according to claim 2, wherein outermost surfaces of said plurality of tape position restricting ribs are on the same plane with the corresponding surfaces of said outer peripheral edge portions.

4. The tape reel according to claim 2, further comprising:

thick portions which are thicker than said thin flange portions being formed at a plurality of places in the vicinity of said outer peripheral edge portions.

5. The tape reel according to claim 4, wherein said thick portions are formed on flange surfaces opposite said tape contact flange surfaces.

6. The tape reel according to claim 4, wherein three tape position restricting ribs are formed equally spaced along each outer peripheral edge portion.

7. The tape reel according to claim 6, wherein said tape position restricting ribs divide the corresponding flange surfaces into three equal portions and said thick portions are located at midpoints along the outer peripheral edge portion of each of said three equal portions.

* * * * *